UNITED STATES PATENT OFFICE.

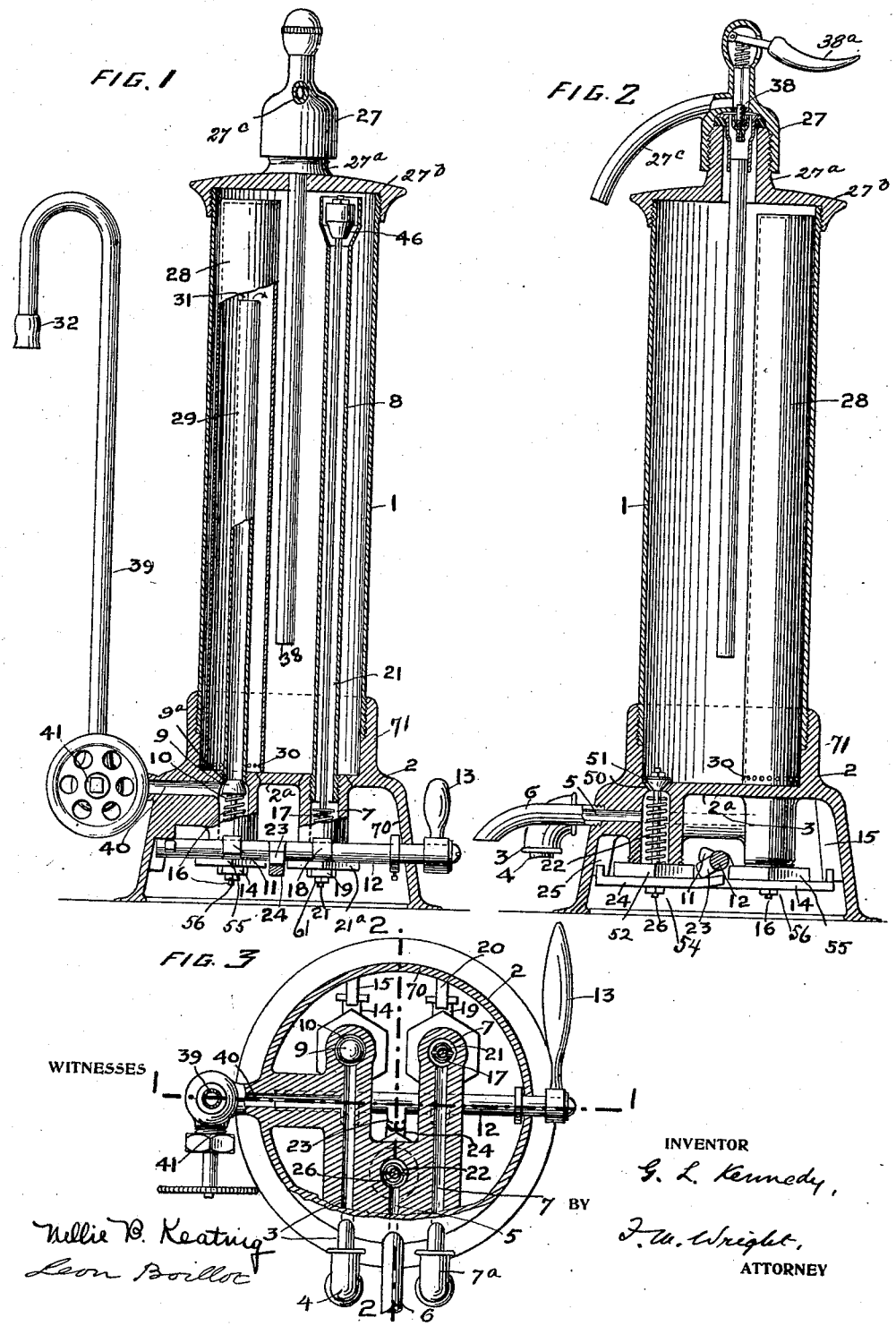

GUY L. KENNEDY, OF SAN FRANCISCO, CALIFORNIA, ASSIGNOR TO NATIONAL CARBONATED LIQUID CO., OF SAN FRANCISCO, CALIFORNIA, A CORPORATION OF CALIFORNIA.

LIQUID CARBONATING AND DISPENSING APPARATUS.

1,029,196.  Specification of Letters Patent.  Patented June 11, 1912.

Application filed April 5, 1909. Serial No. 487,845.

*To all whom it may concern:*

Be it known that I, GUY L. KENNEDY, a citizen of the United States, residing at San Francisco, in the county of San Francisco and State of California, have invented new and useful Improvements in Liquid Carbonating and Dispensing Apparatus, of which the following is a specification.

This invention relates to a liquid carbonating means and a dispensing device combined in a single apparatus, and is designed for use in hotels, restaurants, saloons, candy and drug stores, sanitariums, hospitals, and the like, the apparatus being of such compact form that it is mounted on the counter or bar where connection is had with a source of water under pressure, such as a city main, and with a source of gas under pressure, such as a tank of carbonic dioxid gas, so that the apparatus will manufacture the carbonated liquid by the act of dispensing the same.

The invention has for its primary object to provide a novel arrangement of carbonating and storage chambers in permanent communication whereby the carbonated liquid, as it is manufactured, flows to and rises in the storage chamber continuously as long as carbonated liquid under pressure is dispensed therefrom, by being drawn off like the liquid from an ordinary siphon bottle, or intermittently, as when the carbonated liquid is drawn off by gravity after the storage chamber is vented, after the principle employed in well known dispensing devices.

Another object of the invention is the employment, in connection with such a carbonating and dispensing device as just described, of a valve controlled gooseneck whereby a fine needle-stream of liquid and gas can be drawn off from the apparatus for use in mixing syrups in plain or ice-cream sodas.

A further object is the provision of a novel arrangement of valves and operating means therefor in the base of the apparatus whereby a single movement of a handle closes the inlet valve to interrupt the flow of gas and liquid to the carbonating chamber and successively opens the air vent valve to release the compression in the storage chamber and the dispensing or outlet valve to permit the carbonated liquid to flow from the chamber by gravity at atmospheric pressure.

A further object is the employment of a simple, novel and effective base construction for the device having inlet, outlet and vent passages so arranged that the gas and liquid supply and vent pipes and dispensing spout can be attached to the apparatus at the side of the base so that the said pipes can be brought down around the rear edge of the counter or bar and then bent under the same so that the necessity of marring expensive and handsome bars or counters is avoided by obviating the necessity of boring through them for connecting the said pipes with the carbonating and dispensing apparatus.

With these and other objects in view, the invention comprises the various novel features of construction and arrangement of parts which will be more fully described hereinafter and set forth with particularity in the claims appended hereto.

In the accompanying drawings, which illustrate one embodiment of the invention, Figure 1 is a vertical section taken partly on line 1—1, Fig. 3, and partly to the rear of the line 1—1, to show the arrangement of the inlet and vent valves and the construction of the carbonating device. Fig. 2 is a vertical section taken on line 2—2 Fig. 3. Fig. 3 is a horizontal section through the base of the apparatus.

Similar reference characters are employed to designate corresponding parts throughout the views.

Referring to the drawings, 1 represents a vessel or receptacle that constitutes the storage and compression chamber of the apparatus, said vessel being cylindrical in form and disposed vertically so that a column of carbonated liquid under pressure can be stored therein. This vessel, which is closed at its top, is mounted on a base 2 that is a metal casting formed with a horizontal partition 2ª that constitutes the bottom of the vessel 1, the cylinder of the vessel being screwed into an annular flange 71 rising above the partition. Below the partition is a frusto-conical wall 70 which together with the partition 2ª forms an open bottom chamber that houses the valve operating mechanism of the apparatus. The base of the flange 70 is finished smooth at its bottom so as to rest flat on a counter, bar or other support. Cast integral with the partition are tubular passages 3, 5 and 7 that serve respectively for the admission of gas and liquid, the discharge of carbonated liquid, and the escape of air. These passages lead inwardly from one side of the base 2 so that the pipes 4 and 7ª can extend rearwardly from the apparatus, downwardly past the rear edge of the bar or counter and thence under the latter, thereby avoiding the necessity of boring holes or otherwise marring the counter to connect the pipes with the apparatus.

The dispensing passage 5 which is located between the passages 3 and 7 is provided with a spout 6, by means of which carbonated liquid can be discharged into a tumbler or other receptacle at atmospheric pressure and under gravity flow. The passage 5 terminates in a port 50 in the partition 2ª, as shown in Fig. 2, and at this port is a downwardly-closing outlet valve 51 which is normally closed so as to hold within the vessel 1 a column of carbonated liquid ready to be dispensed. This valve is provided with a downwardly-extending stem 26 which passes through a packing box 52 and through a lever 24 disposed within the chamber of the base, there being a nut 54 on the lower end of the stem which bears against the bottom of the lever 24, which nut, by being turned, can adjust the set of the valve 51. The lever 24, which is disposed horizontally, has its outer end fulcrumed on an abutment or lug 25 cast internally of the base, and the free inner end of the lever engages a cam 23 on a horizontal cam shaft 12 extending diametrically of the chamber of the base and suitably journaled therein. Surrounding the valve stem 26 is a helical spring 22 that tends to open the valve, and when the cam shaft 12 is turned by the handle 13 on the outer end thereof, the valve 21 will open by the spring 22, as shown in Fig. 2.

The passage 3 terminates at its inner end in a port 9ª which is adapted to be closed by a valve 9, the said valve being backed by a spring 10 that tends to close the same. The spring surrounds a downwardly-extending valve rod 16 which passes through a stuffing box 55 and through a lever 14 arranged in the chamber of the base with its outer end fulcrumed on an abutment or lug 15 cast internally of the base, while its inner end is adapted to engage with a cam 11 on the cam shaft. The valve 9 controls the admission of gas and liquid to the apparatus and is adapted to be closed only when carbonated liquid is being dispensed after the storage chamber has been vented. On the lower end of the valve rod 16 is a nut 56 which bears against the lever 14 so that as the lever moves downwardly, the valve will open, and by turning this nut 56, the valve can be adjusted with respect to its seat. The inner end of the vent passage 7 in the base is connected with the top of the storage chamber where air under compression is normally confined, this connection being effected by a vent pipe 8 extending vertically of the chamber 1 with its lower end threaded in the passage 7. At the upper end of the pipe 8 is a vent valve 46 that is connected with the upper end of an operating rod 21 which passes downwardly through a stuffing box 21ª in the base and connects with the lever 19 that is fulcrumed on an internal lug 20 in the base similar to the fulcrum for the lever 14, the said lever 19 being pierced by the rod 21 on which is a nut 61 bearing against the under side of the lever 19. On the valve rod 21 is a spring 17 which coöperates with the lever 19 so that the valve will open and close by the turning of the cam shaft 12 on which is a cam 18 for engaging the lever 19. The cams and levers are so arranged that the turning of the handle 13 in one direction from its normal position will cause the inlet valve 9 to close and the vent valve 46 and dispensing valve 51 to open successively, with the result that connection between the apparatus and heads of liquid and gas will be interrupted, the vessel 1 vented of the compressed air in the top thereof, and the carbonated liquid under atmospheric pressure dispensed from the said vessel. Obviously, with the reverse movement of the handle 13, the said valves will move in reverse order so that gas and liquid will be delivered to the apparatus to become carbonated and to re-charge the same.

The completion of the carbonating of the liquid takes place after the gas and liquid pass the inlet valve and the carbonation is effected by means of a special device located between the said inlet valve and the storage space within the receptacle 1, the said device being of such a nature that gas and liquid mix while the liquid is in transit to the storage chamber. The carbonating device consists in the present instance of a straight upwardly-extending tube or pipe 29 that has its lower end connected with the inlet passage 3 and its upper end open so that the liquid and gas passing through the said pipe will acquire velocity. It will be understood that the gas and liquid are both under pressure and consequently the gas, being compressible and the liquid incompressible, the molecules of gas will be considerably compressed while in transit up the pipe 29. This pipe 29 discharges into a comparatively large chamber formed by a surrounding pipe or tube 28 that is closed at its top and is in open communication through apertures 30 at its bottom with the bottom of the storage and compression chamber 1. This tube 28 constitutes a bell that holds and conserves the gas that separates from the discharging water at the point 31 of the pipe 29. This gas seeks the upper portion of the bell 28, where it is entrapped and subjected to the constantly inrushing stream of water. The particles of water, having considerable momentum, are dashed against the under side of the top of the bell and as the result the water is thoroughly atomized or sprayed downwardly through the body of gas in the top of the bell, resulting in the water becoming carbonated as it passes downwardly and collects in the lower portion of the bell. The carbonated liquid now passes into the chamber 1 through the ports 30 at the bottom of the bell and the liquid gradually rises in both the bell and storage chamber until such a height is reached that the air in the storage chamber becomes compressed to the same pressure as the gas and liquid supplied to the apparatus. At this time, the flow of gas and liquid into the apparatus will cease, although the inlet valve remains open and in the top of the bell will be confined a body of gas under pressure, while in the top of the storage chamber will be confined a body of air under pressure. To dispense this body of carbonated liquid from the compression storage chamber 1, it is merely necessary to close the valve 9 and open the valves 46 and 51, this being done by a partial turn of the handle 13, as before described. As soon as the handle is turned in the opposite direction, the process of carbonation goes on automatically and the storage chamber becomes re-charged.

As the storage chamber is normally charged with carbonated liquid under pressure and as the inlet valve is normally opened, it is possible to draw off a continuous supply of carbonated liquid without the body of liquid in the chamber 1 being diminished. For this purpose, the chamber 1 is provided with a discharge pipe 38 leading in through the top thereof like the outlet pipe of an ordinary siphon bottle, and at the top of this pipe is a nipple 27 that connects with the neck 27ª on the cap 27ᵇ of the vessel 1, there being a discharge spout 27ᶜ normally closed by a valve 38. This valve is opened by pressing a handle 38ª like that of an ordinary siphon bottle, and as long as the valve is held open, carbonated liquid will be discharged from the spout 27ª under pressure. The pressure will be maintained continuously within the storage chamber of the vessel, since the inlet valve 9 is kept open, and consequently carbonated liquid will be manufactured automatically as long as the outlet valve 38 is kept open and as long as the supplies of liquid and carbonating gas are maintained. It will thus be seen that with a single device, carbonated liquid can be drawn off at atmospheric pressure by means of the spout 6 when the handle 13 is manipulated, or carbonated liquid can be drawn off at maximum pressure by the mere opening of the valve 38.

The apparatus is also equipped with a gooseneck by means of which a fine stream of liquid and gas can be dispensed for preparing plain or ice-cream sodas. The inlet passage 3 has a branch 40 leading out of one side of the base, and connected with this branch is a gooseneck 39 that terminates in a nozzle 32. The gooseneck is normally closed by a valve 41, and as the branch is located at the inlet side of the valve 9, gas and liquid can be drawn off through the gooseneck at any time, independently of the position of the inlet valve 9. Thus, by means of the gooseneck, the apparatus can be used for dispensing liquid and gas in still a third condition.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. A liquid carbonating and dispensing apparatus comprising means from which gas and liquid under pressure are discharged upwardly, a gas-holding bell disposed over and surrounding the said means to form a carbonating chamber and so located with respect to said means as to serve as a baffle against which the liquid strikes and is sprayed downwardly therefrom through the gas in the bell, a compression storage vessel having its bottom in open communication with the bottom of the bell whereby the carbonated liquid forms a seal between and rises in the bell and vessel until the compression in the vessel is substantially the same as the pressure of gas and liquid flowing in the said means, and a valve controlled outlet for drawing off the carbonated liquid from the vessel.

2. A liquid carbonating and dispensing apparatus comprising means from which gas and liquid under pressure are discharged upwardly, a gas-holding bell disposed over and surrounding the said means to form a carbonating chamber and to serve as a baffle against which the liquid strikes and is sprayed downwardly therefrom through the gas in the bell, a compression storage vessel surrounding and in open communication at its bottom with the bottom of the bell whereby the carbonated liquid forms a seal between and rises in the bell and vessel until the compression in the vessel is substantially the same as the pressure of gas and liquid flowing in the said means, and a valved outlet through which carbonated liquid flows from the vessel while the gas is sealed in said bell.

3. A combined carbonating and dispensing apparatus comprising a storage or dispensing reservoir, a carbonator adapted to hold a body of gas and having a valveless connection therewith, a dispenser of liquid at full pressure, a dispenser of liquid under gravity flow at atmospheric pressure, valve means for admitting gas and liquid under pressure to the carbonator and adapted to be open when the pressure dispenser is operating and closed when the gravity dispenser is operating, and means for holding air under pressure in the reservoir while the pressure dispenser is operating and for releasing the air pressure when the gravity dispenser is operating.

4. A liquid carbonating and dispensing apparatus comprising means from which gas and liquid under pressure are discharged upwardly, a gas-holding bell disposed over and surrounding the said means to form a carbonating chamber and to serve as a baffle against which the liquid strikes and is sprayed downwardly therefrom through the gas in the bell, a compression storage vessel in open communication with the bottom of the bell whereby the carbonated liquid rises in the bell and vessel until the compression in the vessel is substantially the same as the pressure of gas and liquid flowing in the said means, a valve-controlled vent for permitting the air under compression in the top of the vessel to escape, means for interrupting the discharge of gas and liquid into the vessel while the vent is open, and means for drawing off the carbonated liquid from the vessel while the vent is open.

5. A liquid carbonating and dispensing apparatus comprising means from which gas and liquid under pressure are discharged upwardly, a gas-holding bell disposed over and surrounding the said means to form a carbonating chamber and to serve as a baffle against which the liquid strikes and is sprayed downwardly therefrom through the gas in the bell, a compression storage vessel in open communication with the bottom of the bell whereby the carbonated liquid rises in the bell and vessel until the compression in the vessel is substantially the same as the pressure of gas and liquid flowing in the said means, a vent valve for permitting the air under compression in the vessel to escape, an inlet valve for controlling the admission of gas and liquid to the bell, a dispensing valve for controlling the discharge of carbonated liquid from the vessel, and a mechanism for first closing the inlet valve and then opening the vent and dispensing valve in succession.

6. A liquid carbonating and dispensing apparatus comprising an upright inlet pipe through which liquid and gas are adapted to flow under pressure and discharge forcibly from the upper end, said pipe normally holding a column of liquid and gas, a closed top chamber inclosing the pipe to form a gas retaining and liquid carbonating device and normally holding a column of carbonated liquid that maintains between its top and the top of the column in the said pipe a body of gas, a vessel normally holding a column of carbonated liquid inclosing the said chamber with its bottom in permanent free communication with the bottom of the chamber whereby carbonated liquid can flow into the vessel and rise simultaneously in the chamber and vessel until the compression of the gas in the former and of the air in the latter is the same as the pressure of the gas and liquid admitted through the said inlet pipe, and a dispensing means for drawing carbonated liquid directly from the vessel.

7. A liquid carbonating and dispensing apparatus comprising an upright inlet pipe through which liquid and gas flow under pressure and discharge forcibly from the upper end, a closed top chamber inclosing the pipe to form a gas retaining and liquid carbonating device, a vessel inclosing the said chamber and having its bottom in permanent free communication with the bottom of the chamber whereby carbonated liquid can flow into the vessel and rise simultaneously in the chamber and vessel until the compression of the gas in the former and of the air in the latter is the same as the pressure of the gas and liquid admitted through the said inlet pipe, a dispensing means for drawing off carbonating liquid at the full pressure in the vessel, another dispensing means operative independently of the first for drawing off carbonated liquid by gravity at atmospheric pressure, means for permitting the flow of liquid and gas to be uninterrupted through the said inlet pipe when the first dispensing means is operating and for interrupting such flow while the second dispensing means is operating, and means operatively connected and simultaneously movable with the last-mentioned means for reducing the compression in the vessel before the second dispensing means is opened, the said chamber being sealed at its bottom by the liquid at all times during the operation of either dispensing means for maintaining gas entrapped in the top of the chamber.

8. A liquid carbonating and dispensing apparatus comprising an upright inlet pipe through which liquid and gas flow under pressure and discharge forcibly from the upper end, a closed top chamber inclosing the pipe to form a gas retaining and liquid carbonating device, a vessel inclosing the said chamber and having a permanent free communication with the bottom of the chamber whereby carbonated liquid can flow into the vessel and rise simultaneously in the chamber and vessel until the compression of the gas in the former and of the air in the latter is the same as the pressure of the gas and liquid admitted through the said inlet pipe, a dispensing means for drawing off carbonating liquid at the full pressure in the vessel, another dispensing means operative independently of the first for drawing off carbonated liquid by gravity at atmospheric pressure, means for closing the inlet pipe before the second dispensing means is opened and normally open to permit liquid and gas to flow into the inlet pipe at the same rate that carbonated liquid flows out of the first-mentioned dispensing means when the latter is open, and means for reducing the compression in the vessel before the second dispensing means is opened.

9. A liquid carbonating and dispensing apparatus comprising a compression storage vessel for holding a column of carbonated liquid, a bell of substantially the same length as the vessel for holding a column of carbonated liquid and a body of gas above the column and having its bottom in open communication with the bottom of the vessel whereby said columns form a seal for maintaining the said body of gas in the bell, a device located in the upper portion of the bell for discharging gas and liquid directly against the under side of the top of the bell for atomizing the liquid in the presence of the free gas in the bell for carbonating the liquid, a normally open inlet valve through which the liquid and gas flows as long as the pressure in the bell and vessel is less than the pressure of the gas and liquid flowing in the said device, and means for dispensing carbonated liquid from the vessel, and operatively connected with the valve to close the same when the liquid is dispensed.

10. A liquid carbonating and dispensing apparatus comprising a compression storage vessel for carbonated liquid, an upright inlet pipe through which gas and liquid under pressure flow, said pipe being straight to permit the gas and liquid to maintain substantially its initial velocity in passing through the pipe and out of the upper end thereof, a device surrounding the pipe to hold the gas issuing therefrom and to form a baffle against which the liquid and gas strike to be atomized thereby for carbonating the liquid, the bottom of said vessel and device being in communication to permit the carbonated liquid to enter the vessel, and means for drawing off the liquid from the vessel.

11. A liquid carbonating and dispensing apparatus comprising two chambers permanently communicating at the bottom whereby liquid enters one chamber from the other and columns of liquid rise in both, means in the top of one chamber and above the column of liquid therein for atomizing gas and liquid and commingling them to produce carbonated liquid, and means for drawing off carbonated liquid from the other chamber.

12. A liquid carbonating and dispensing apparatus comprising a carbonating chamber and a storage compression chamber communicating at the bottom and closed at the top whereby liquid can flow from the carbonating to the storage chamber and rise in both and compress the gas and air in the top of the carbonating and storage chambers respectively, means for supplying gas and liquid into the carbonating chamber under pressure and causing atomizing and mixing of the gas and liquid therein, and means for drawing off the carbonated liquid from the storage chamber.

13. A liquid carbonating and dispensing apparatus comprising an inlet conduit through which gas and liquid under pressure flow, a valve-controlled gooseneck connected with the branch, an upwardly-discharging tube connected with the conduit, a valve controlling the flow through the tube, a larger tube extending longitudinally of and surrounding the first-mentioned tube and having an upper closed end that forms a baffle against which the liquid and gas are forcibly discharged for atomizing and mixing the liquid and gas, a storage compression chamber permanently communicating with the lower end of the second tube and so disposed that carbonated liquid can flow out of the latter into the chamber, and a valve-controlled dispensing outlet connected with the chamber for delivering carbonated liquid therefrom.

14. A liquid carbonating and dispensing apparatus comprising an inlet conduit through which gas and liquid under pressure flow, a valve-controlled gooseneck connected with the branch, an upwardly-discharging tube connected with the conduit, a valve controlling the flow through the tube, a larger tube extending longitudinally of and surrounding the first-mentioned tube and having an upper closed end that forms a baffle against which the liquid and gas are forcibly discharged for atomizing and mixing the liquid and gas, a storage compression chamber permanently communicating with the lower end of the second tube and is so disposed that carbonated liquid can flow out of the latter into the chamber, a vent valve for permitting the air under compression in the chamber to escape, a valve controlled dispensing outlet through which carbonated liquid is drawn from the chamber after the vent valve is opened and the inlet valve is closed, and means for drawing off carbonated liquid from the chamber under pressure while the inlet valve is opened and while the vent valve and dispensing outlet are closed.

15. A liquid carbonating and dispensing apparatus comprising a compression storage vessel for holding a column of carbonating liquid, an upwardly-discharging pipe in the vessel for admitting liquid and gas under pressure, a tube having a closed top and disposed longitudinally of and surrounding the pipe and longer than the same to provide a gas-holding and carbonating chamber at the upper end of the pipe, said tube being open at its bottom whereby carbonated liquid can flow therefrom into the vessel and rise therein at the same time the carbonated liquid rises in the tube, a valve normally closing the discharging pipe, a normally open valve for admitting gas and liquid to the first-mentioned pipe, a vent pipe having its inlet at the upper end of the vessel, a valve controlling the vent pipe, a dispensing means through which carbonated liquid flows by gravity after the vent valve is opened, an outlet valve in the dispensing means, a mechanism for closing the inlet valve and opening the vent and outlet valves in succession, and a second dispensing means operative only when the first dispensing means is idle and the vent valve is closed and the inlet valve opened.

16. A liquid carbonating and dispensing apparatus comprising a compression storage chamber, an inlet pipe rising from the bottom of the chamber, a tube extending from the bottom of the chamber to the top thereof and surrounding the said pipe to form a gas-holding and liquid carbonating chamber in open communication at its bottom with the first-mentioned chamber, a vent pipe rising from the bottom of the storage chamber and leading to the top thereof, a valve controlling the vent pipe, an inlet valve controlling the entrance of the first-mentioned pipe, a dispensing means at the bottom of the storage chamber, an outlet valve in the said means, and an operating mechanism for the said valves to interrupt the inflow of gas and liquid and open the vent and outlet valves in succession.

17. A liquid carbonating and dispensing apparatus comprising a base formed with separate passages for the inlet of liquid and gas and the outlet of air and of carbonated liquid, said passages extending into the base from the side thereof, pipes connected with the inlet and vent passages, a dispensing spout connected with the outlet passage for the carbonated liquid, a vessel attached to the base and having its bottom closed thereby, a carbonating and gas-holding device housed in the vessel and connected with the said inlet passage for receiving gas and liquid under pressure, said device being in open communication at its bottom with the said vessel to permit carbonated liquid to rise in the latter, valves controlling the said passages, and means for closing the valve of the inlet passage and opening the valves in the vent and outlet passages in succession.

18. A liquid carbonating and dispensing apparatus comprising a base formed with separate passages for the inlet of liquid and gas and the outlet of air and of carbonated liquid, said passages extending into the base from the side thereof, pipes connected with the inlet and vent passages, a dispensing spout connected with the outlet passage for the carbonated liquid, a vessel attached to the base and having its bottom closed thereby, a carbonating and gas-holding device housed in the vessel and connected with the said inlet passage for receiving gas and liquid under pressure, said device being in open communication at its bottom with the said vessel to permit carbonated liquid to rise in the latter, valves controlling the said passages, stems on the valves leading downwardly therefrom, springs acting on the stems, levers connected with the stems and coöperating with the springs for opening and closing the valves, and a cam shaft mounted in the base and operatively related to the levers to cause by a continuous movement in one direction of the shaft the inlet valve to close and the vent and outlet valves to open in succession or vice versa.

19. A liquid carbonating and dispensing apparatus comprising a base having a horizontal partition forming an open bottom chamber below the same, a vessel attached to the base and having its bottom closed by the said partition, a plurality of passages in the base respectively for the admission of gas and liquid to the valve and the discharge of carbonated liquid and the vent of air from the vessel, an upright pipe connected with the inlet passage and extending upwardly into the vessel with its upper end open, a pipe of larger diameter than the first-mentioned pipe and surrounding the same with its lower end resting on the partition and its upper end closed to form a carbonating and gas-holding chamber, said second pipe being in open communication with the bottom of the vessel, an inlet valve in the inlet passage for controlling the gas and liquid supply to the first-mentioned pipe, a vent pipe having its lower end connected with the said vent passage in the base and its upper end communicating with the top of the vessel, a valve controlling the vent pipe, an outlet valve controlling the outlet of the carbonated liquid from the said vessel, and an operating mechanism for the said valves located in the base and accessible through the open bottom of the chamber therein.

20. A liquid carbonating and dispensing apparatus comprising a base formed with three passages respectively for the admission of gas and liquid and the vent of air and the outlet of carbonated liquid, a compression storage vessel attached to the base and rising therefrom, an upright pipe having its lower end communicating with the inlet passage, an upwardly-closing inlet valve at the lower end of the pipe, means surrounding the pipe and forming within the vessel a gas conserving and carbonating chamber in open communication at its bottom with the bottom of the vessel, a downwardly-closing outlet valve controlling the outlet passage, a vent pipe having its lower end communicating with the vent passage of the base and its upper end terminating in the upper portion of the vessel, a downwardly closing vent valve in the upper end of the said vent pipe, rods connected with the valves and extending downwardly into the base, and means within the base for vertically moving the valves in such order that the inlet valve closes and the vent and outlet valves open successively or vice versa.

21. A liquid carbonating and dispensing apparatus comprising a base formed with three passages respectively for the admission of gas and liquid and the vent of air and the outlet of carbonated liquid, a compression storage vessel attached to the base and rising therefrom, an upright pipe having its lower end communicating with the inlet passage, an upwardly-closing inlet valve at the lower end of the pipe, means surrounding the pipe and forming within the vessel a gas conserving and carbonating chamber in open communication at its bottom with the bottom of the vessel, a downwardly closing outlet valve controlling the outlet passage, a vent pipe having its lower end communicating with the vent passage of the base and its upper end terminating in the upper portion of the vessel, a downwardly-closing vent valve in the upper end of the said vent pipe, rods connected with the valves and extending downwardly into the base, a cam shaft mounted in the base, levers connected with the valve rods and fulcrumed in the base, a cam on the shaft for operating each lever to move each valve in one direction, and springs coöperating with the levers for moving the valves in the opposite direction.

22. A liquid carbonating and dispensing apparatus comprising a base formed with three passages respectively for the admission of gas and liquid and the vent of air and the discharge of carbonated liquid, a compression storage chamber supported by the base and with which the discharge passage for carbonated liquid directly connects at the bottom, a pipe for connecting the vent passage with the top of the vessel, a device housed within the vessel for producing carbonated liquid from the gas and liquid and for delivering the carbonated liquid into the bottom of the vessel whereby the liquid rises and compresses the air therein, vertically movable valves controlling the said passages, rods on the valves extending downwardly in the base, levers mounted in the base and connected respectively with the valve rods and extending transversely thereto to move the valves downwardly, springs on the rods for moving the valves upwardly, a cam shaft mounted in the base and extending across the levers, and cams on the shaft engaging the respective levers for moving the valves downwardly.

23. A carbonating and dispensing apparatus comprising a carbonating device having entrapped at all times a body of gas and through which atomized liquid passes, a storage or dispensing chamber having a gas sealed communication with the carbonating device and arranged to receive carbonated liquid from the latter, and means for drawing carbonated liquid either under full or at atmospheric pressure from the chamber while the gas is maintained in the said device.

24. A carbonating liquid apparatus comprising means for containing a column of partially carbonated liquid, means for containing a column of carbonated liquid and having its upper end separated from the first column by a body of gas entrapped between the columns, means for holding a column of dispensable carbonated liquid, said latter column joining at its bottom the bottom of the column in the second means, means for supplying a partially carbonated liquid under pressure to and through the first means and through the said body of gas, and dispensing means for drawing from the third column carbonated liquid.

In testimony whereof I have hereunto set my hand in the presence of two subscribing witnesses.

GUY L. KENNEDY.

Witnesses:
FRANCIS M. WRIGHT,
D. B. RICHARDS.

---

Copies of this patent may be obtained for five cents each, by addressing the "Commissioner of Patents, Washington, D. C."